United States Patent
Iida et al.

(10) Patent No.: US 8,459,313 B2
(45) Date of Patent: Jun. 11, 2013

(54) GAS FUEL VEHICLE

(75) Inventors: Yasuyuki Iida, Toyota (JP); Keiichi Kondo, Chiryu (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 495 days.

(21) Appl. No.: 12/679,715

(22) PCT Filed: Sep. 24, 2008

(86) PCT No.: PCT/JP2008/067158
§ 371 (c)(1),
(2), (4) Date: Mar. 24, 2010

(87) PCT Pub. No.: WO2009/041418
PCT Pub. Date: Apr. 2, 2009

(65) Prior Publication Data
US 2010/0206427 A1    Aug. 19, 2010

(30) Foreign Application Priority Data
Sep. 25, 2007    (JP) ................................ 2007-247255

(51) Int. Cl.
*B60K 15/04*    (2006.01)
(52) U.S. Cl.
USPC .............. 141/83; 141/86; 141/94; 141/311 A; 220/86.2
(58) Field of Classification Search
USPC .... 141/83, 94, 348–350, 86, 311 A; 220/86.2
See application file for complete search history.

(56) References Cited

U.S. PATENT DOCUMENTS

| 5,509,296 | A  | * | 4/1996  | Kolb ........................... 73/40.5 R |
| 5,701,928 | A  | * | 12/1997 | Aoki ............................... 141/98 |
| 6,557,596 | B2 | * | 5/2003  | Ono et al. .................. 141/311 A |
| 6,904,944 | B2 | * | 6/2005  | Satou et al. ..................... 141/100 |
| 7,028,724 | B2 | * | 4/2006  | Cohen et al. ..................... 141/94 |
| 7,699,127 | B2 | * | 4/2010  | Horii et al. .................... 180/65.1 |
| 2006/0040161 | A1 | * | 2/2006 | Horii et al. ....................... 429/34 |

FOREIGN PATENT DOCUMENTS

| DE | 102 06 921 A1 | 9/2002 |
| JP | 2001-10355 A  | 1/2001 |
| JP | 2002-240746 A | 8/2002 |
| JP | 2004-142588 A | 5/2004 |
| JP | 2006-232093 A | 9/2006 |

* cited by examiner

*Primary Examiner* — Gregory Huson
*Assistant Examiner* — Nicolas A Arnett
(74) *Attorney, Agent, or Firm* — Kenyon & Kenyon LLP

(57) ABSTRACT

[Problem to be Solved] A gas fuel vehicle capable of detecting a gas leakage on the back side of a fuel fill port (inside of a vehicle body) extremely easily is provided.
[Means for Solving the Problem] The gas fuel vehicle includes: a gas filling port that receives a supply of a gas fuel from a fuel supply device on the outside of a vehicle body; a communicating hole that connects the inside of the vehicle body and the outside of the vehicle body; a shielding member that shields the fuel fill port and the communicating hole from the outside of the vehicle body; and a gas fuel storage unit that stores the gas fuel supplied from the fuel supply device through the fuel fill port. A rod portion of a gas leakage detector is inserted into the communicating hole from the outside of the vehicle body, thereby detecting a gas leakage inside the vehicle body.

6 Claims, 4 Drawing Sheets

GAS FUEL VEHICLE

This is a 371 national phase application of PCT/JP2008/067158 filed 24 Sep. 2008, which claims priority to Japanese Patent Application No. 2007-247255 filed 25 Sep. 2007, the contents of which are incorporated herein by reference.

TECHNICAL FIELD

The present invention relates to a gas fuel vehicle.

Gas fuel vehicles such as natural gas automobiles which use compressed natural gas as a fuel and hydrogen automobiles/fuel cell automobiles which use hydrogen gas as a fuel are currently proposed. When filling such a gas fuel vehicle with a gas fuel, a method in which: a fuel fill nozzle of an external fuel supply device is connected to a fuel fill port of the gas fuel vehicle; and a gas fuel supplied from the fuel supply device is filled into a fuel container inside a vehicle body via the fuel fill port and a pipe connected to the fuel fill port is employed.

In recent years, a fuel fill unit structure in which: a folding earth connecting member is provided in the vicinity of a fuel fill port; and both the fuel fill port and the earth connecting member are shielded by a single lid (lid member) together has been proposed (for example, see Patent Document 1). With such a structure, both a filling of a gas fuel and an earth connection can be achieved by opening the single lid.

Patent Document 1: Japanese laid-open patent publication No. 2006-232093

DISCLOSURE OF THE INVENTION

Problem to be Solved by the Invention

During or after a filling of a gas fuel to a gas fuel vehicle, the gas fuel may leak from, e.g., a joint inside a vehicle body which connects a fuel fill port and a pipe. In order to detect such a gas leakage, a gas leakage detector needs to be inserted into the inside of the vehicle body so that the gas leakage detector is used to detect a gas leakage inside the vehicle body.

However, in a conventional fuel fill unit structure as disclosed in Patent Document 1 above, a fuel fill port is arranged at a position far from a lower surface of a vehicle body (lower frame), and a large number of components are arranged in the periphery of the fuel fill port. Therefore, it has been difficult to insert a gas leakage detector into the back side of the fuel fill port (inside of the vehicle body) to detect a gas leakage.

The present invention has been made in light of the above circumstances, and an object of the invention is to provide a gas fuel vehicle capable of detecting a gas leakage on the back side of a fuel fill port (inside of a vehicle body) extremely easily.

Means for Solving the Problem

In order to attain the above object, the present invention provides a gas fuel vehicle comprising: a gas filling port that receives a supply of a gas fuel from a fuel supply device on the outside of a vehicle body; a communicating hole that connects the inside of the vehicle body and the outside of the vehicle body; a shielding member that shields the fuel fill port and the communicating hole from the outside of the vehicle body; and a gas fuel storage unit that stores the gas fuel supplied from the fuel supply device through the fuel fill port.

With such a configuration, the communicating hole is provided in the vicinity of the fuel fill port of the gas fuel vehicle (at a position shielded, together with the fuel fill port, by the shielding member). Therefore, for example, a rod-like gas leakage detector is inserted into the communicating hole from the outside of the vehicle body, thereby detecting a gas leakage on the back side of the fuel fill port (inside of the vehicle body) extremely easily.

In the gas fuel vehicle, the communicating hole is preferably provided with a film member having a flexible hole which prevents the gas fuel from passing from the inside of the vehicle body to the outside of the vehicle body when the gas leakage detector is not inserted into the communicating hole and allows, through flexure, an insertion of the gas leakage detector when the gas leakage detector is inserted into the communicating hole.

With such a configuration, the communicating hole is provided with the film member having the above specific function. Therefore, when the rod-like gas leakage detector is not inserted into the communicating hole, the gas fuel can be prevented from passing from the inside of the vehicle body to the outside of the vehicle body. Accordingly, an increase in gas concentration in a space on the back side of the shielding member with a little air circulation can be prevented.

Also, hydrogen may be employed as the gas fuel in the gas fuel vehicle. In such a case, the communicating hole is preferably arranged above the fuel fill port With such a configuration, the gas leakage detector is inserted into the communicating hole arranged above the fuel fill port, so that the gas leakage detector can be arranged in an upper part on the inside of the vehicle body. Accordingly, a gas leakage can be detected easily even when hydrogen (gas fuel), which is lighter than air, leaks and accumulates in an upper space on the inside of the vehicle body,.

Effect of the Invention

According to the present invention, a gas fuel vehicle which is capable of detecting a gas leakage on the back side of a fuel fill port (inside of a vehicle body) extremely easily can be provided.

Best Mode For Carrying out the Invention

A gas fuel vehicle according to an embodiment of the present invention will hereinafter be described with reference to the attached drawings. In this embodiment, a fuel cell vehicle 1 which employs hydrogen gas as a fuel will be described as an example of the gas fuel vehicle.

First, the overall configuration of the fuel cell vehicle 1 according to this embodiment will be described with reference to FIGS. 1 and 2. The fuel cell vehicle 1 is provided with a vehicle body 10, a fuel fill unit 20 provided in the rear of a side surface of the vehicle body 10, hydrogen tanks 30 which store hydrogen gas as a gas fuel, a pipe 40 which connects the fuel fill unit 20 and the hydrogen tanks 30, wheels (front wheels and rear wheels) 50 for driving, etc.

The vehicle body 10 has a lower frame 11 arranged below a sheet (not shown). Provided on the lower frame 11 are the plurality of hydrogen tanks 30, as shown in FIGS. 1 and 2. Also, a recess 12 having side surfaces 12a and a bottom surface 12b is provided in the rear of the side surface of the vehicle body 10, as shown in FIG. 2. The bottom surface 12b of the recess 12 is provided with a hole for the attachment of a fuel-filling-unit member 21 (FIG. 3). The vehicle body 10 is provided with a lid member 13 for shielding the recess 12 through a hinge 14.

The fuel fill unit 20 is a part for receiving the supply of hydrogen gas from a fuel supply device (not shown) which is on the outside of the vehicle body, and is constituted by: the fuel-filling-unit member 21 (FIG. 3) attached to the bottom surface 12b of the recess 12 of the vehicle body 10, the lid member 13 provided to the vehicle body 10, etc. The fuel-filling-unit member 21 will be described below in detail.

The hydrogen tanks 30 are containers for storing the hydrogen gas supplied via the fuel fill unit 20 and the pipe 40, and correspond to the gas fuel storage unit in the invention. As shown in FIGS. 1 and 2, the hydrogen tanks 30 are arranged, in a vertical direction, below a fuel fill port 22 (described below) which is provided to the fuel-filling-unit member 21 constituting the fuel fill unit 20. One end 41 of the pipe 40 is connected to a portion on the back side of the fuel fill port 22 (portion on the inside of the vehicle body) through a joint 60. The other end 42 of the pipe 40 is connected to a gas port 31 provided to an end of each of the hydrogen tanks 30.

Next, the fuel-filling-unit member 21 that constitutes the fuel fill unit 20 of the fuel cell vehicle 1 according to this embodiment will be described with reference to FIGS. 3 and 4.

The fuel-filling-unit member 21 is a plate member having a shape and a size (area) which block the hole formed in the bottom surface 12b of the recess 12 of the vehicle body 10 of the fuel cell vehicle 1, as shown in FIGS. 3 and 4. Provided at a substantially center part of the fuel-filling-unit member 21 is the fuel fill port 22, to which a fuel fill nozzle (not shown) of the fuel supply device on the outside of the vehicle body 10 is connected so that the fuel fill port 22 receives the supply of hydrogen gas. A valve mechanism and a filter for preventing a back flow of hydrogen gas are provided inside the fuel fill port 22. Also, the fuel fill port 22 is covered with a cap 23 for preventing the entry of foreign matter into the fuel fill port 22. The attachment/detachment of the cap 23 is attained through a hand of a filler (operator or salesperson) of the hydrogen gas.

Provided above and in the vicinity of the fuel fill port 22 of the fuel-filling-unit member 21 is a detector hole 24 through which a rod portion 71 of a gas leakage detector 70 is inserted from the outside of the vehicle body 10. The detector hole 24 connects the inside of the vehicle body 10 and the outside of the vehicle body 10, and corresponds to the communicating hole in the invention. In this embodiment, the detector hole 24 having a horizontally long shape (linear shape) is employed, as shown in FIG. 3.

The detector hole 24 is provided with a grommet 25. The grommet 25 has a horizontally long hole (slit) that allows the insertion of the rod portion 71 of the gas leakage detector 70 into the detector hole 24, and also, prevents hydrogen gas from passing from the inside of the vehicle body 10 to the outside of the vehicle body 10 when the rod portion 71 is not inserted into the detector hole 24. The detector hole 24 corresponds to the film member in the invention. The grommet 25 is formed of a material having flexibility (e.g., rubber material).

The fuel-filling-unit member 21 provided with the fuel fill port 22 and the detector hole 24 is entirely shielded from the outside of the vehicle body 10 by the lid member 13 provided to the vehicle body 10. In other words, the lid member 13 shields the fuel fill port 22 and the detector hole 24 from the outside of the vehicle body 10, and corresponds to the shielding member in the invention.

Next, a method of detecting a gas leakage inside the vehicle body 10 of the fuel cell vehicle 1 according to this embodiment will be described.

During or after a filling of hydrogen gas to the fuel cell vehicle 1 from the fuel supply device, the hydrogen gas may leak from, e.g., the joint 60 inside the vehicle body 10, which connects the fuel fill port 22 and the pipe 40. In a conventional fuel fill unit structure, a fuel fill port is arranged at a position far from a lower frame of a vehicle body, and a large number of components are arranged in the periphery of the fuel fill port. Therefore, it has been difficult to insert a gas leakage detector into the back side of the fuel fill port (inside of the vehicle body) to detect a gas leakage.

By contrast, in this embodiment, the rod portion 71 of the gas leakage detector 70 is inserted into the detector hole 24 provided to the fuel-filling-unit member 21, as shown in FIG. 4, thereby easily detecting a gas leakage inside the vehicle body 10.

In the fuel cell vehicle 1 according to the embodiment described above, the detector hole 24 is provided in the vicinity of the fuel fill port 22 (at the position shielded, together with the fuel fill port 22, by the lid member 13). Therefore, the gas leakage detector 70 can be inserted into the detector hole 24 from the outside of the vehicle body 10. Accordingly, a gas leakage on the back side of the fuel fill port 22 (inside of the vehicle body 10) can be detected extremely easily.

In the fuel cell vehicle 1 according to the embodiment described above, the detector hole 24 is provided with the grommet 25. Therefore, when the gas leakage detector 70 is not inserted into the detector hole 24, the gas fuel can be prevented from passing from the inside of the vehicle body 10 to the outside of the vehicle body 10. Accordingly, an increase in gas concentration in a space on the back side of the lid member 13 with a little air circulation can be prevented.

In the fuel cell vehicle 1 according to the embodiment described above, the gas leakage detector 70 is inserted into the detector hole 24 arranged above the fuel fill port 22, so that the gas leakage detector 70 can be arranged in an upper part on the inside of the vehicle body 10. Accordingly, a gas leakage can be detected easily even when hydrogen gas, which is lighter than air, leaks and accumulates in an upper space on the inside of the vehicle body 10.

It is to be noted that, although the embodiment above shows the example in which the detector hole 24 is arranged above the fuel fill port 22, the position of the detector hole 24 is not limited thereto. For example, the detector hole 24 may be arranged on the lateral side of the fuel fill port 22. Also, when natural gas which is heavier than air is employed as a gas fuel, the detector hole 24 is arranged below the fuel fill port 22.

Although the embodiment above shows the example of employing the horizontally long (linear shape) detector hole 24 and employing the grommet 25 having a horizontally long hole (slit), the shape and dimension (length and width) of each of the detector hole 24 and the hole of the grommet 25 may be set arbitrarily in accordance with the shape and dimension of the rod portion 71 of the gas leakage detector 70. For example, a detector hole having a circular shape or rectangular shape may be employed, and also a grommet having a cross shape (slit) may be employed.

Although the embodiment above shows the example of employing, as the shielding member, the lid member 13 that shields the recess 12 provided to the vehicle body 10 and the fuel-filling-unit member 21 having the fuel fill port 22 and the detector hole 24 together from the outside of the vehicle body 10, the structure of the shielding member is not limited thereto. For example, a cap having a special shape which can cover both the fuel fill port 22 and the detector hole 24 may be employed as the shielding member.

Industrial Applicability

The present invention can be applied to fuel cell vehicles as described in the embodiment above. Also, in addition to the fuel cell vehicles, the present invention can be applied to gas fuel vehicles (hydrogen automobiles, natural gas automobiles, etc.).

DESCRIPTION OF SYMBOLS

Figure 1:
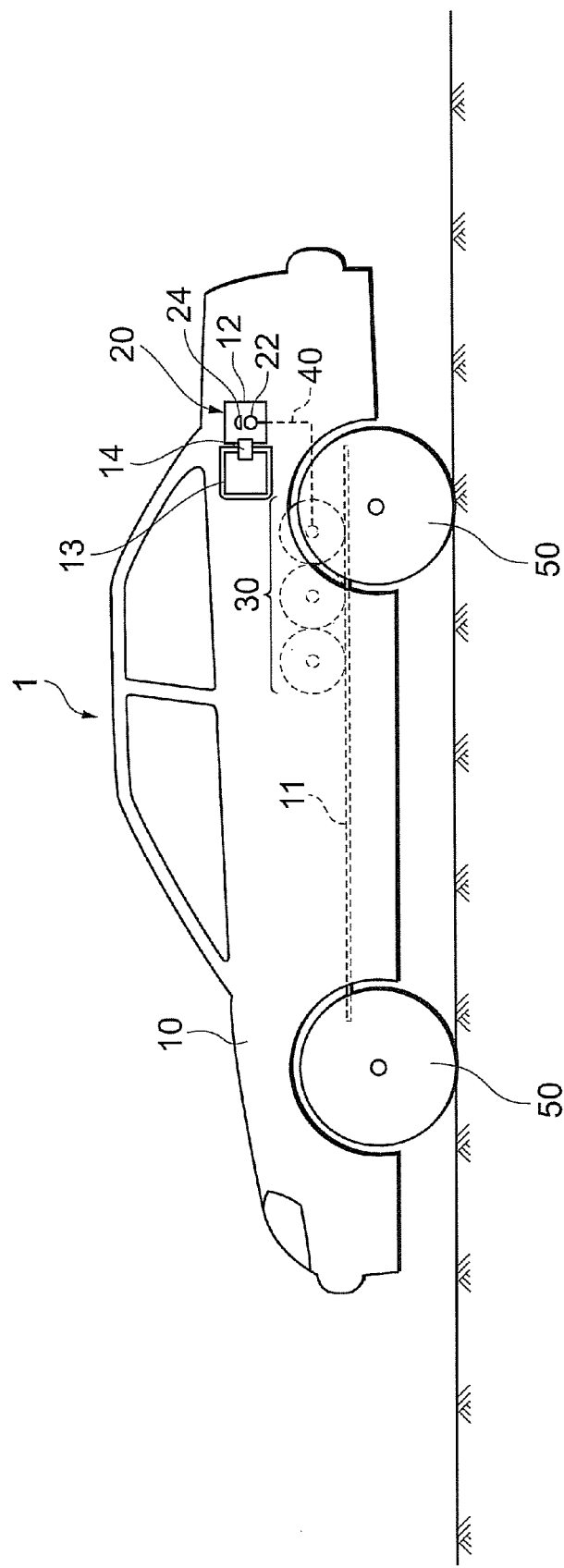
FIG. 1 is a side view of a gas fuel vehicle (fuel cell vehicle) according to an embodiment of the invention.
Figure 2:
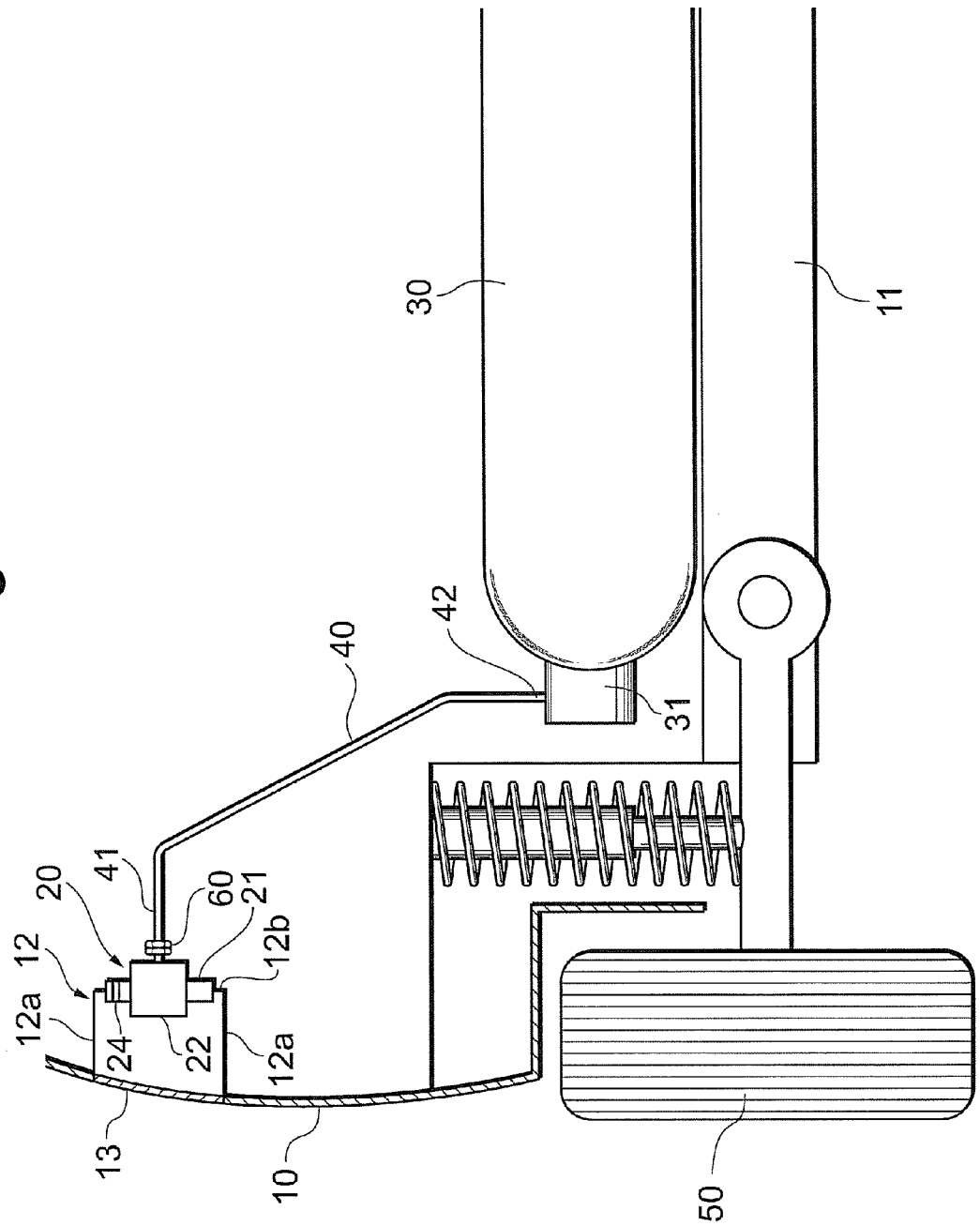
FIG. 2 is a configuration diagram of an internal configuration of the fuel cell vehicle illustrated in FIG. 1.
Figure 3:
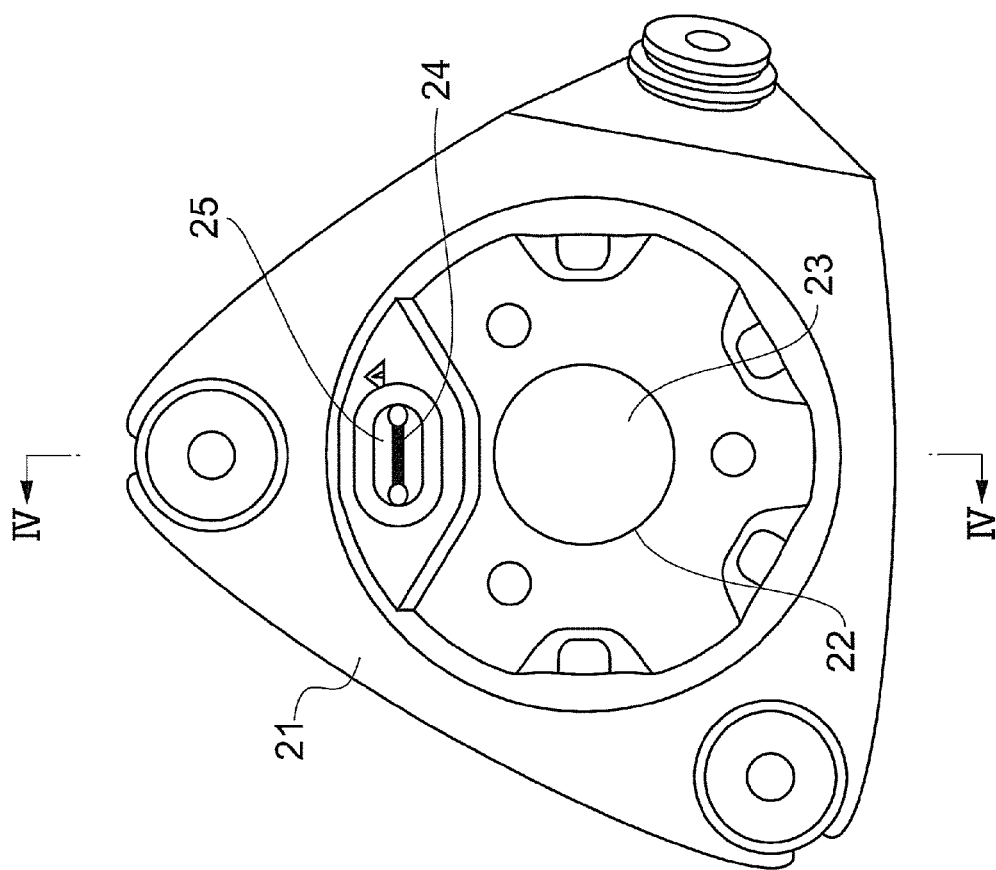
FIG. 3 is a plan view of a fuel-filling-unit member of the fuel cell vehicle illustrated in FIG. 1.
Figure 4:
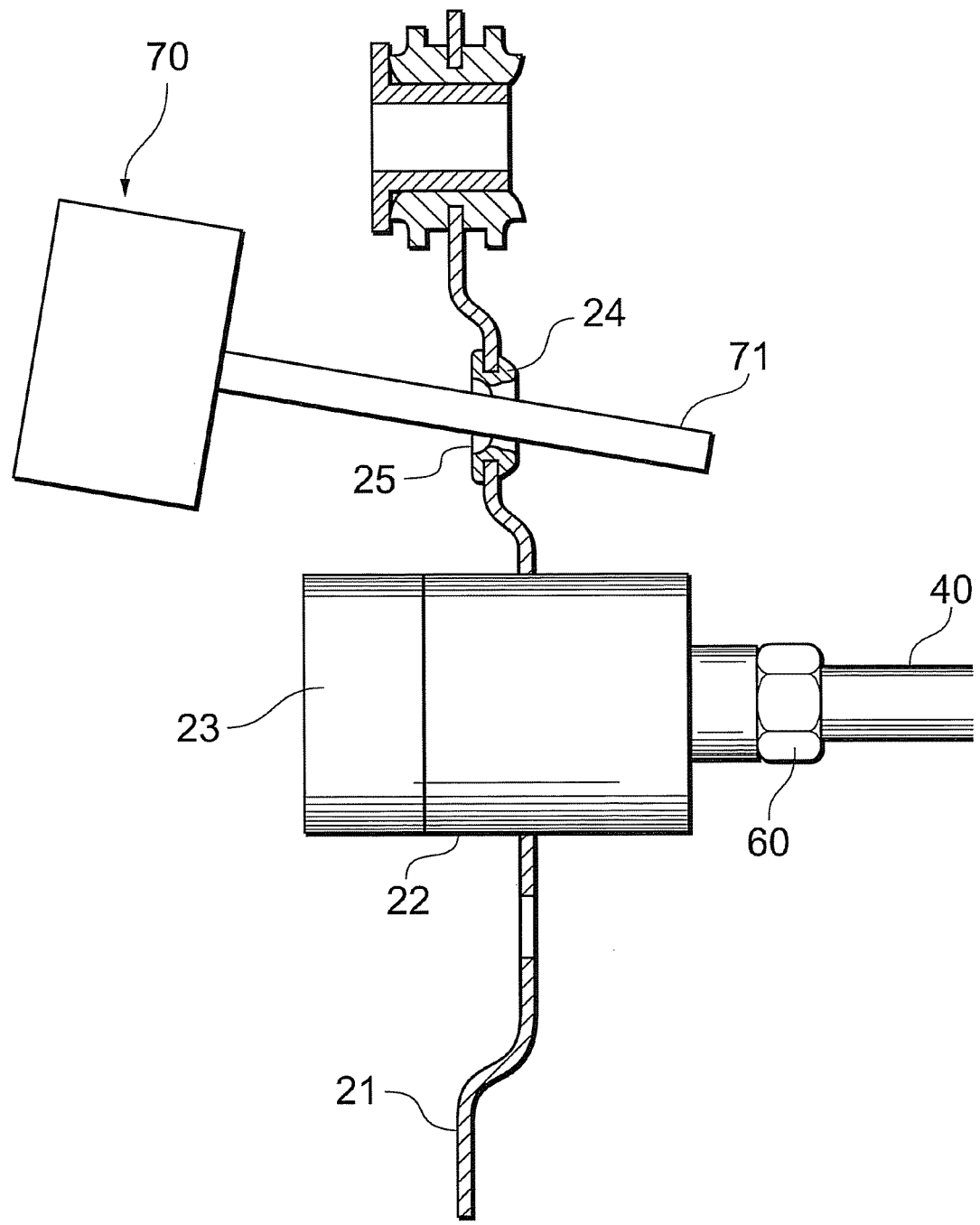
FIG. 4 is a sectional view taken along portion IV-IV in FIG. 3 of the fuel-filling-unit member of the fuel cell vehicle illustrated in FIG. 1.

1: fuel cell vehicle (gas fuel vehicle), 10: vehicle body, 13: lid member (shielding member), 22: fuel fill port, 24: detector hole (communicating hole), 25: grommet (film member), 30: hydrogen tanks (gas fuel storage unit), 70: gas leakage detector.

What is claimed is:

1. A gas fuel vehicle comprising: a fuel fill port that receives a supply of a gas fuel from a fuel supply device on the outside of a vehicle body; a communicating hole that connects the inside of the vehicle body and the outside of the vehicle body; a shielding member that shields the fuel fill port and the communicating hole from the outside of the vehicle body; and a gas fuel storage unit that stores the gas fuel supplied from the fuel supply device through the fuel fill port, wherein the communicating hole includes a grommet that covers the communicating hole and forms a grommet opening that is smaller than the communicating hole such that the grommet opening is designed to support and receive a gas leakage detector that is inserted from the outside of the vehicle body for detecting a leakage that occurs when the gas fuel is supplied to the gas fuel storage unit.

2. The gas fuel vehicle according to claim 1, wherein the communicating hole is provided with a film member having a flexible hole which prevents the gas fuel from passing from the inside of the vehicle body to the outside of the vehicle body when the gas leakage detector is not inserted into the communicating hole and allows, through flexure, an insertion of the gas leakage detector when the gas leakage detector is inserted into the communicating hole.

3. The gas fuel vehicle according to claim 1, wherein: the gas fuel is hydrogen; and the communicating hole is arranged above the fuel fill port.

4. A gas fuel vehicle comprising: a fuel fill port that receives a supply of a gas fuel from a fuel supply device on the outside of a vehicle body; a communicating hole that connects the inside of the vehicle body and the outside of the vehicle body; a shielding member that shields the fuel fill port and the communicating hole from the outside of the vehicle body; and a gas fuel storage unit that stores the gas fuel supplied from the fuel supply device through the fuel fill port, wherein the communicating hole is designed such that a gas leakage detector for detecting a leakage that occurs when the gas fuel is supplied to the gas fuel storage unit is inserted from the outside of the vehicle body, wherein the communicating hole is provided with a film member having a flexible hole which prevents the gas fuel from passing from the inside of the vehicle body to the outside of the vehicle body when the gas leakage detector is not inserted into the communicating hole and allows, through flexure, an insertion of the gas leakage detector when the gas leakage detector is inserted into the communicating hole.

5. The gas fuel vehicle according to claim 4, wherein: the gas fuel is hydrogen; and the communicating hole is arranged above the fuel fill port.

6. A method of detecting a gas leakage inside a body of a gas fuel vehicle, the vehicle including a fuel fill port that receives a supply of a gas fuel from a fuel supply device on the outside of a vehicle body; a communicating hole that connects the inside of the vehicle body and the outside of the vehicle body; a shielding member that shields the fuel fill port and the communicating hole from the outside of the vehicle body; and a gas fuel storage unit that stores the gas fuel supplied from the fuel supply device through the fuel fill port, wherein the method comprises the steps of:

providing a gas leakage detector for detecting a leakage that occurs when the gas fuel is supplied to the gas fuel storage unit; and inserting the gas leakage detector from outside of the vehicle body and through the communicating hole to detect a leakage.

\* \* \* \* \*